Inventor
Frank H. LeJeune
By Whittemore Hulbert Whittemore Belknap
Attorneys

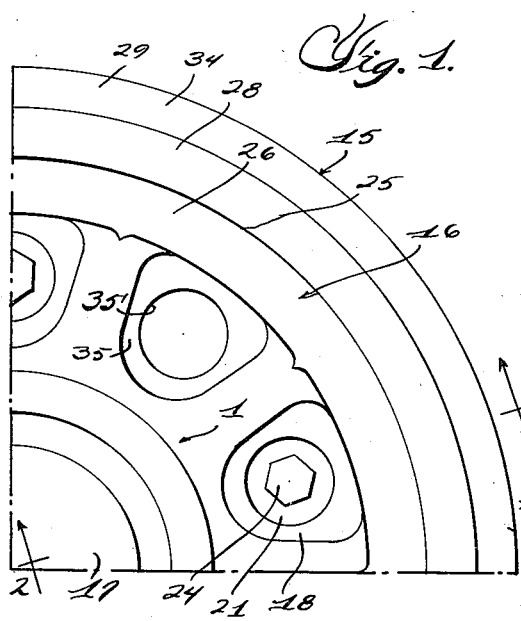
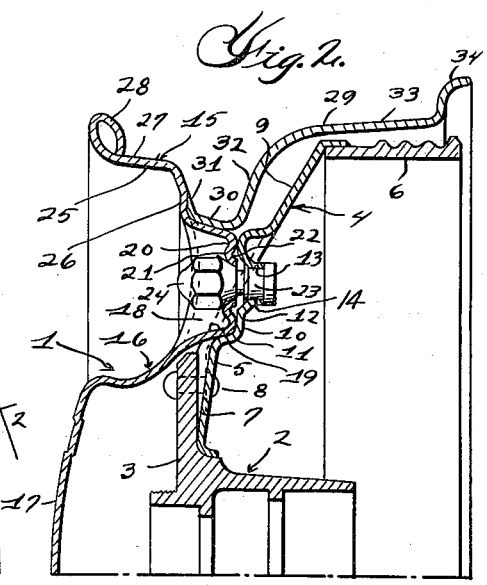
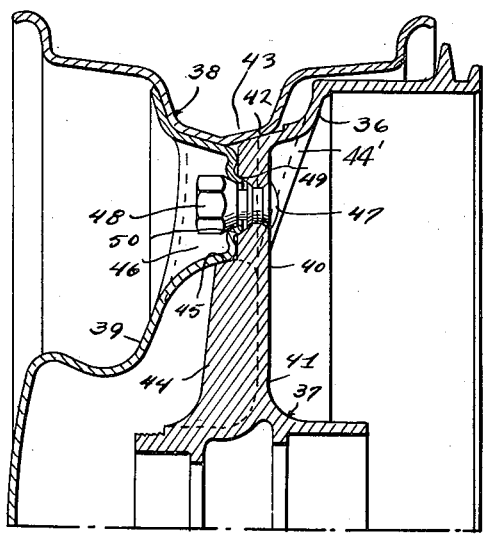

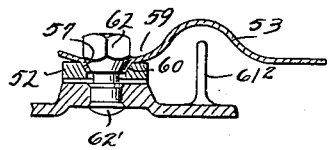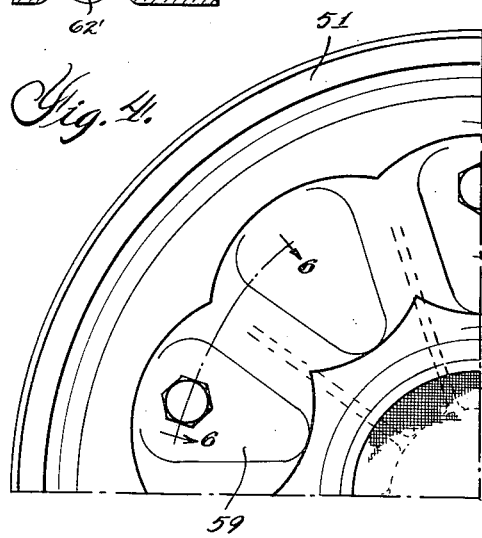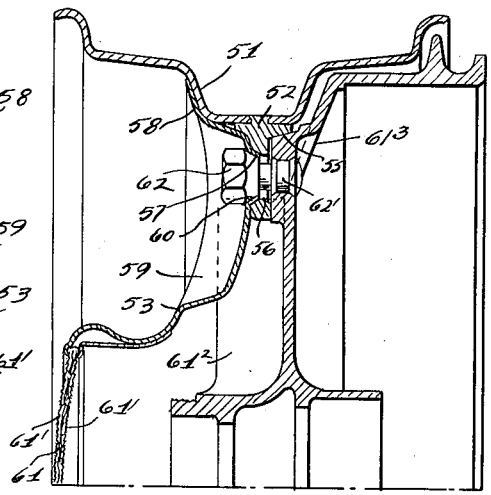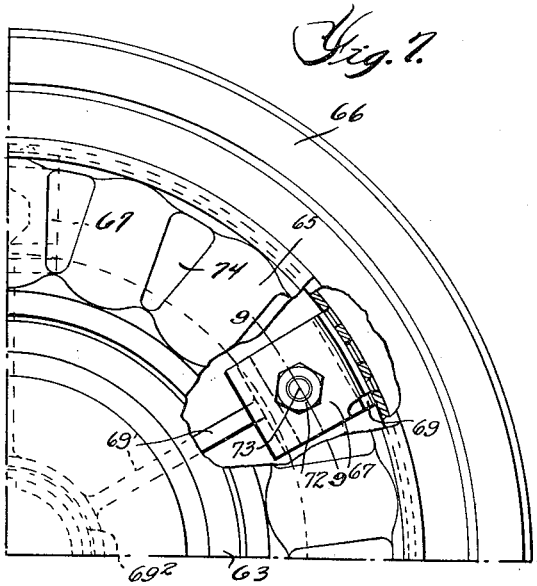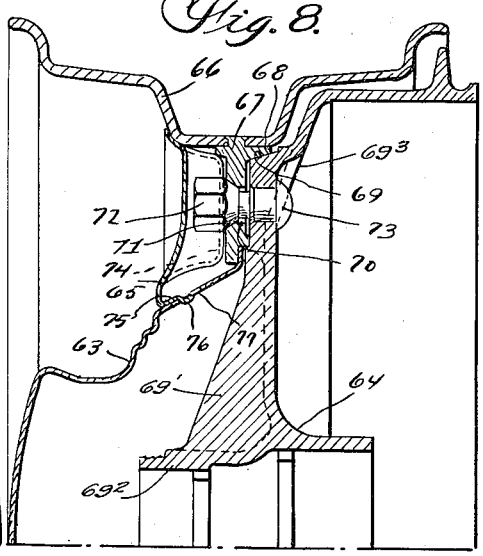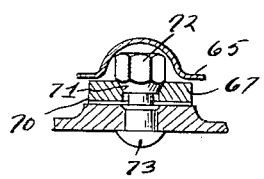
Inventor
Frank H. Le Jeune Oct. 29, 1935. F. H. LE JEUNE 2,019,145
WHEEL
Filed Aug. 15, 1932 3 Sheets-Sheet 3

Patented Oct. 29, 1935

2,019,145

UNITED STATES PATENT OFFICE 2,019,145

WHEEL

Frank H. Le Jeune, Detroit, Mich., assignor, by mesne assignments, to The Kelsey-Hayes Wheel Company, Detroit, Mich., a corporation of Delaware Application August 15, 1932, Serial No. 628,930

2 Claims. (Cl. 301—6)

The invention relates to wheels and refers more particularly to wheels for use with motor vehicles. One of the objects of the invention is to provide an improved vehicle wheel which is simple in construction but sufficiently strong to withstand all stresses to which it may be ordinarily subjected in use. Another object is to provide a wheel which is particularly adapted to be made pleasing and ornamental in appearance. A further object is to so construct the wheel that it may be readily mounted or demounted.

These and other objects of the invention will become apparent from the following description, taken in connection with the accompanying drawings, in which Figure 1 is a front elevation of a wheel showing an embodiment of my invention;

Figure 2 is a cross section on the line 2—2 of Figure 1;

Figure 3 is a view similar to Figure 2 showing another embodiment of my invention;

Figures 4 and 5 are views similar to Figures 1 and 2, respectively, showing another embodiment of my invention;

Figure 6 is a cross section on the line 6—6 of Figure 4;

Figures 7 and 8 are views similar to Figures 1 and 2, respectively, showing another embodiment of my invention, Figure 7 being partly in section;

Figure 9 is a cross section on the line 9—9 of Figure 7;

Figure 11:
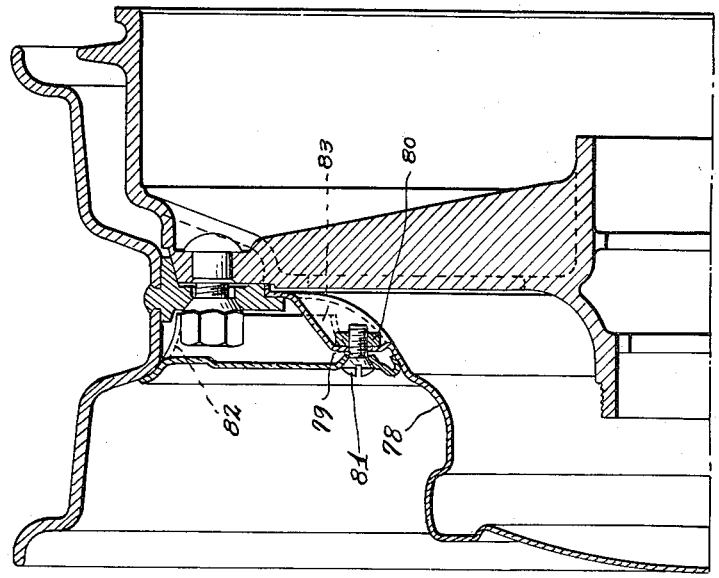
Figures 10 and 11 are views similar to Figures 1 and 2, respectively, showing another embodiment of my invention, Figure 10 being partly in section.

The motor vehicle wheel shown in Figures 1 and 2 has the wheel body 1, which is adapted to be mounted upon the hub 2. This hub has the fixed radially extending annular flange 3 to which is fixedly secured the brake drum 4 which, as shown in the present instance, is a composite brake drum having the sheet metal back or web 5 and the annular brake engaging member 6, which may be formed of suitable material such as iron or steel and which, in the present instance, is formed of special high carbon steel. The back or web has the central portion 7, which is preferably permanently secured to the rear or inboard side of the fixed flange 3 by suitable means, such as the rivets 8 and the outer portion 9, which is inclined rearwardly or toward the inboard side. This outer portion is formed with the annular series of recesses 10 radially outwardly beyond the fixed flange 3, each recess having the tapered seat 11 and the radially extending wall 12, which latter is provided with the axially extending opening 13 surrounded by the cylindrical flange 14.

The wheel body comprises the rim member 15 and the disk member 16. The disk member is formed of sheet metal and has the central portion 17 which extends over and conceals the hub member 2 and its fixed flange 3. This disk member also has the annular series of depressions 18, which are adapted to extend into the recesses 10 and have the tapered portions 19 for engagement with the tapered seats 11 and the radially extending portions 20 for abutting the radially extending walls 12 spaced from and encircling the holes 13. As shown in the present instance, the depressions are centrally bossed at 21 and these bosses are provided with holes surrounded by the frusto-conical flanges 22. Bolts 23 are permanently secured in the holes 13 registering with the frusto-conical flanges and these bolts extend through these flanges and are detachably engaged by the nuts 24, which have correspondingly tapered noses for engaging the flanges and thereby detachably securing the wheel body to the brake drum or upon the hub.

As shown in the present instance, the front or outboard portion of the rim member 15 is formed by the integral peripheral portion 25 of the disk member 16. This peripheral portion has the radially outwardly extending annular wall 26, the laterally extending annular ledge 27 and the radially outwardly extending annular tire retaining flange 28. 29 is a sheet metal ring or annulus at the rear or inboard side of the peripheral portion 25 and having the inner annular portion 30 encircling the outer walls of the depressions 18 and terminating in the tapered radially outwardly extending edge portion 31 at the rear or inboard side of the wall 26. The portions 30 and 31 are permanently secured to the outer wall portions of the recesses 18 and the wall 26 by suitable means, such as welds. The ring or annulus has the radially outwardly extending annular wall 32 leading from the portion 30, the laterally extending annular ledge 33 and the radially outwardly extending annular tire retaining flange 34.

The portions of the disk member 16 between the central portion 17 and the peripheral portion 25 are provided with the relatively shallow depressions 35 having the holes 35', these depressions 35 being between the depressions 18 and these holes 35' having their axes on the same circle line as the axes of the frusto-conical flanges 22 and the holes formed thereby. These holes 35' provide for circulation of air between the brake drum and the rim member.

Figure 3 discloses another modification in which the brake drum 36 is formed integral with the hub member 37 and the rim member 38 of the wheel body is formed separately from but permanently secured to the disk member 39 of the wheel body. More specifically, the back or web 40 of the brake drum merges into the fixed or radially extending flange 41 of the hub member. This back or web preferably has the annular series of tapered seats 42 which are concentric and have the same radius and which are adapted for engagement by a correspondingly tapered portion of the annular wall 43 of the rim member. The back or web 40 is provided with the integral reinforcing ribs 44' which are hollow and extend radially between the seats 42. The fixed flange of the hub member is reinforced by the radially extending ribs 44 which terminate at their outer ends in the tapered seats 45 and these tapered seats with the back or web form, in effect, an annular series of recesses which are engageable by the depressions 46 formed in the sheet metal disk member 39. The wheel body is detachably secured upon the hub member by the bolts 47 and the nuts 48, the latter having tapered noses for engaging the tapered or frusto-conical flanges 49 in the depressions and these flanges in turn engage the walls of the tapered recesses 50 formed in the back or web of the brake drum. The tapered seats 42 are located radially outwardly beyond the bolts, there being one seat beyond each bolt.

Figures 4, 5 and 6 disclose another modification of wheel in which the wheel body comprises the tire carrying rim member 51, the clamps 52 secured to and extending radially inwardly from the base of the well of the rim member and the sheet metal disk member 53. The clamps have the annular series of tapered seats 55 upon the back or web of the brake drum. These clamps extend at the front or outboard side of the back or web and have the axially extending holes 56 therethrough which at their front or outboard ends are flared to provide the tapered seats 57. The disk member 53 has the outer peripheral portion 58 which is permanently secured to the rim member 51 as by being welded to the front or outboard wall of its annular well. This disk member has its intermediate portion formed with the depressions 59 with alternate depressions provided with the frusto-conical or tapered flanges 60 for engaging the tapered seats 57. This disk member also has its central portion formed to filter the air which passes through the central portion and between the disk and rim members and the brake drum to provide for ventilation of the latter. To facilitate the passage of air the back or web has the integral radially extending hollow reinforcing ribs 61³ between the seats for the clamps. More particularly, the central portion comprises the air filtering material 61 and the fine screen 61' on opposite sides of the filtering material. 61² are radially extending ribs upon and preferably integral with the back or web of the brake drum and the hub and extending within the spoke simulating portions of the disk member between the depressions 59, these ribs serving as fan blades to effect flow of the air. 62 are nuts threaded upon the bolts 62' and having tapered noses fitting the tapered flanges 60 and detachably securing the wheel body upon the hub.

Figures 7, 8 and 9 disclose another modification in which the disk member is formed of the central disk portion 63 extending over the hub 64 and the intermediate disk portion 65 extending between the central disk portion and the tire carrying rim member 66. The central disk portion 63 is preferably formed of sheet metal and is permanently secured, as by welding, to the inner portions of the clamps 67 which extend radially inwardly from and are permanently secured to the rim member. This central disk portion may, if desired, be provided with the air filtering device shown in Figures 4, 5 and 6. These clamps, as in the previous modification, have the tapered portions 68 for engaging the annular series of tapered seats 69 upon the back or web of the brake drum and also have the axially extending holes 70 terminating at their front or outboard ends in the tapered seats 71. These seats are engaged by the nuts 72 threaded upon the bolts 73, the latter being permanently secured to the back or web of the brake drum. The intermediate disk portion 65 is a ring preferably formed of sheet metal and has portions extending over and concealing the nuts 72 and is preferably provided with the depressed portions 74 extending between the nuts. The inner edge portion of this ring is in the nature of an annular flange 75 and it is provided with the radially inwardly extending depressions 76 which are adapted to snap into the holes 77 formed in the central disk member 63. The outer edge portion of this ring is adapted to firmly engage the front or outboard side of the rim member. The back or web of the brake drum, as shown, is formed with the integral reinforcing ribs 69' which extend radially from the hub portion 69² to the portions having the seats 69. The back or web also is formed with the integral radially extending hollow ribs 69³ between the seats 69.

Figure 10:
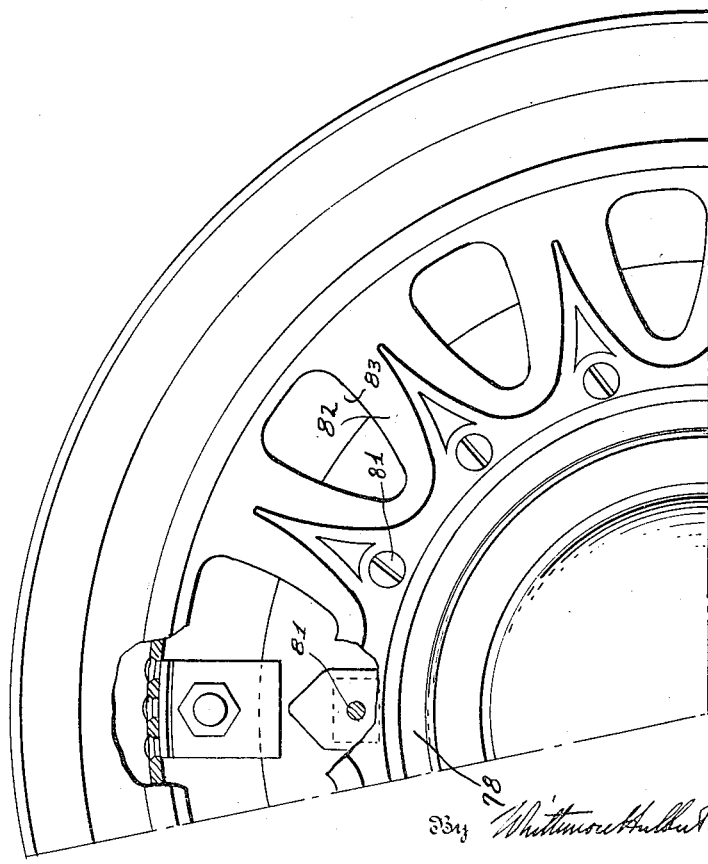

In the modification shown in Figures 10 and 11, the central sheet metal disk member 78 is formed with the annular series of bosses 79 to the rear or inboard sides of which are permanently secured, as by welding, the plates 80. The intermediate sheet metal disk member, which is in the nature of a ring, is detachably secured in place by means of the screws 81, which are adapted to threadedly engage the plates 80, or both these plates and the bosses 79. This ring member has portions also extending over and concealing the securing nuts and its portions between the nuts may be provided with suitable configurations which, as shown in the present instance, are depressions 82 having the holes 83.

From the above description, it will be readily seen that I have provided a construction of motor vehicle wheel which is simple and strong and which may have a number of configurations or contours to secure different appearances.

What I claim as my invention is:

1. In a wheel, the combination of a hub member, a wheel body mounted on said hub member and comprising a rim member, clamping means secured to said rim member and a disk member secured to said clamping means, means engaging said clamping means for securing said wheel body to said hub member, and an annulus provided with a substantially axially rearwardly extending portion at its radially inner edge having snap engagement with said disk member and extending over said securing means and engaging said rim member.

2. In a wheel, the combination of a hub member, a wheel body unit comprising a rim member, mounting means and a disk member having a portion radially within said mounting means extending axially forwardly and radially inwardly, means for securing said mounting means to said hub member, and an annulus extending over said securing means and secured to said unit, said annulus having a spoked formation and being formed at its radially inner edge portion with a substantially rearwardly extending portion engaging said axially forwardly and radially inwardly extending portion.

FRANK H. LE JEUNE.